(12) United States Patent
He et al.

(10) Patent No.: US 10,897,756 B2
(45) Date of Patent: Jan. 19, 2021

(54) TRANSMISSION OF UPLINK CONTROL INFORMATION IN WIRELESS SYSTEMS

(71) Applicant: Apple Inc., Cupertino, CA (US)

(72) Inventors: Hong He, Beijing (CN); Seunghee Han, San Jose, CA (US); Alexei Vladimirovich Davydov, Nizhny Novgorod (RU); Gang Xiong, Beaverton, OR (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/707,563

(22) Filed: Dec. 9, 2019

(65) Prior Publication Data

US 2020/0154416 A1    May 14, 2020

Related U.S. Application Data

(63) Continuation of application No. 15/963,482, filed on Apr. 26, 2018, now Pat. No. 10,506,579, which is a
(Continued)

(51) Int. Cl.
*H04W 72/04* (2009.01)
*H04L 1/18* (2006.01)
(Continued)

(52) U.S. Cl.
CPC ......... *H04W 72/042* (2013.01); *H04L 1/0026* (2013.01); *H04L 1/1607* (2013.01);
(Continued)

(58) Field of Classification Search
CPC ............ H04W 72/042; H04W 52/325; H04W 72/0413; H04W 72/12; H04L 1/0026;
(Continued)

(56) References Cited

U.S. PATENT DOCUMENTS

| | | | |
|---|---|---|---|
| 9,313,779 B2 | 4/2016 | Han et al. | |
| 2010/0098012 A1* | 4/2010 | Bala | H04W 72/0446 370/329 |

(Continued)

FOREIGN PATENT DOCUMENTS

| | | |
|---|---|---|
| CN | 107925532 A | 4/2018 |
| WO | 2013172674 A1 | 11/2013 |

(Continued)

OTHER PUBLICATIONS

"European Application Serial No. 15904216.7, Extended European Search Report dated Jul. 18, 19", 8 pgs.
(Continued)

*Primary Examiner* — Kevin D Mew
(74) *Attorney, Agent, or Firm* — Kowert, Hood, Munyon, Rankin & Goetzel, P.C.

(57) ABSTRACT

Future LTE systems will support massive carrier aggregation that necessitates transmission of a large number of acknowledgement signals (HARQ-ACKs) in response to downlink data transmitted over multiple component carriers. Described herein are methods and apparatus for efficiently transmitting HARQ-ACK and periodic channel state information (P-CSI) bits over the PUCCH (physical uplink control channel).

20 Claims, 6 Drawing Sheets

Related U.S. Application Data continuation of application No. 15/760,975, filed as application No. PCT/US2015/000312 on Dec. 23, 2015, now Pat. No. 10,499,384.

(60) Provisional application No. 62/219,950, filed on Sep. 17, 2015.

(51) Int. Cl.
　　*H04L 1/16*　　(2006.01)
　　*H04L 5/00*　　(2006.01)
　　*H04L 1/00*　　(2006.01)
　　*H04W 52/32*　　(2009.01)
　　*H04W 72/12*　　(2009.01)

(52) U.S. Cl.
　　CPC ........ *H04L 1/1671* (2013.01); *H04L 1/1812* (2013.01); *H04L 1/1861* (2013.01); *H04L 5/001* (2013.01); *H04L 5/0023* (2013.01); *H04L 5/0055* (2013.01); *H04L 5/0057* (2013.01); *H04W 52/325* (2013.01); *H04W 72/0413* (2013.01); *H04W 72/12* (2013.01); *H04L 1/0073* (2013.01)

(58) Field of Classification Search
　　CPC ... H04L 1/0073; H04L 1/1607; H04L 1/1671; H04L 1/1812; H04L 1/1861; H04L 5/001; H04L 5/0023; H04L 5/0055; H04L 5/0057
　　See application file for complete search history.

(56) References Cited

U.S. PATENT DOCUMENTS

| | | | |
|---|---|---|---|
| 2010/0271970 A1* | 10/2010 | Pan | H04L 1/0029 370/252 |
| 2011/0243066 A1 | 10/2011 | Nayeb Nazar et al. | |
| 2013/0094410 A1 | 4/2013 | Yang et al. | |
| 2013/0163536 A1* | 6/2013 | Anderson | H04L 5/0037 370/329 |
| 2013/0176982 A1* | 7/2013 | Han | H04L 1/0073 370/329 |
| 2013/0182627 A1* | 7/2013 | Lee | H04L 5/0016 370/311 |
| 2013/0223301 A1 | 8/2013 | Lee et al. | |
| 2013/0258960 A1 | 10/2013 | Chen et al. | |
| 2014/0003452 A1 | 1/2014 | Han et al. | |
| 2014/0071928 A1 | 3/2014 | Papasakellariou et al. | |
| 2014/0078942 A1 | 3/2014 | Noh et al. | |
| 2014/0092865 A1 | 4/2014 | Heo et al. | |
| 2014/0241298 A1 | 8/2014 | Park et al. | |
| 2014/0341145 A1* | 11/2014 | Nakashima | H04L 5/0053 370/329 |
| 2015/0029990 A1 | 1/2015 | Marinier et al. | |
| 2015/0036556 A1 | 2/2015 | Imamura et al. | |
| 2015/0049699 A1* | 2/2015 | Takeda | H04W 76/15 370/329 |
| 2015/0131565 A1 | 5/2015 | Nakashima et al. | |
| 2016/0226629 A1 | 8/2016 | Liu et al. | |
| 2016/0295561 A1 | 10/2016 | Papasakellariou | |
| 2017/0289993 A1 | 10/2017 | Yerramalli et al. | |
| 2017/0289995 A1 | 10/2017 | Lin et al. | |
| 2018/0006791 A1 | 1/2018 | Marinier et al. | |
| 2018/0097578 A1 | 4/2018 | Li et al. | |
| 2018/0249458 A1 | 8/2018 | He et al. | |
| 2018/0263021 A1 | 9/2018 | He et al. | |
| 2018/0295608 A1 | 10/2018 | Nguyen et al. | |
| 2018/0359057 A1 | 12/2018 | Yang et al. | |
| 2019/0098580 A1 | 3/2019 | Babaei et al. | |

FOREIGN PATENT DOCUMENTS

| | | |
|---|---|---|
| WO | 2014022862 A1 | 2/2014 |
| WO | 2017048215 A1 | 3/2017 |

OTHER PUBLICATIONS

"U.S. Appl. No. 15/760,975, Non Final Office Action dated Mar. 22, 2019", 7 pgs.

"European Application Serial No. 15904216.7, Invitation pursuant to Rule 63(1) EPC mailed Apr. 4, 2019", 3 pgs.

"U.S. Appl. No. 15/760,975, Response filed Jun. 18, 2019 to Non Final Office Action dated Mar. 22, 2019", 11 pgs.

"U.S. Appl. No. 15/760,975, Notice of Allowance dated Jul. 16, 2019", 7 pgs.

"3GPP; TSGRAN; E-UTRA; Physical layer procedures (Release 12)", 3GPP TS36213 V12.6.0, [Online] retrieved from the internet:<(http://www.3gpp.org/dynareport/36213.titrn)>, (Jul. 3, 2015).

"International Application Serial No. PCT/US2015/000312, International Search Report dated Jun. 29, 2016", 8 pgs.

"International Application Serial No. PCT/US2015/000312, Written Opinion dated Jun. 29, 2016", 5 pgs.

"European Application Serial No. 15904216.7, Response filed Nov. 5, 2018 to Communication pursuant to Rules 161(2) and 162 EPC dated Apr. 25, 2018", 5 pgs.

"U.S. Appl. No. 15/963,482, Non Final Office Action dated May 1, 2019", 10 pgs.

U.S. Appl. No. 15/963,482, filed Apr. 26, 2018 entitled Transmission of Uplink Control Information in Wireless Systems.

"International Application Serial No. PCT US2015 000312, International Preliminary Report on Patentability dated Mar. 29, 2018", 7 pgs.

\* cited by examiner

TRANSMISSION OF UPLINK CONTROL INFORMATION IN WIRELESS SYSTEMS

PRIORITY CLAIM

This application is a continuation of U.S. patent application Ser. No. 15/963,482, filed Apr. 26, 2018, which is a continuation of U.S. patent application Ser. No. 15/760,975, filed Mar. 16, 2018 (now U.S. Pat. No. 10,499,384), which is a U.S. National Stage Filing under 35 U.S.C. 371 from International Application No. PCT/US2015/0003 12, filed on Dec. 23, 2015, now published as WO 2017/048215 which claims priority to U.S. Provisional Patent Application Ser. No. 62/219,950, filed Sep. 17, 2015, which are incorporated herein by reference in their entirety as though completely set forth herein.

TECHNICAL FIELD

Embodiments described herein relate generally to wireless networks and communications systems. Some embodiments relate to cellular communication networks including 3GPP (Third Generation Partnership Project) networks, 3GPP LTE (Long Term Evolution) networks, and 3GPP LTE-A (LTE Advanced) networks, although the scope of the embodiments is not limited in this respect.

BACKGROUND

In Long Term Evolution (LTE) systems, a mobile terminal (referred to as a User Equipment or UE) connects to the cellular network via a base station (referred to as an evolved Node B or eNB). Previous releases of the LTE specifications supported communication between the UE and the eNB over either a single carrier for both the UL (uplink) and DL (downlink) in the ease of TDD (time division duplex) mode or separate UL and DL carriers in the case of FDD (frequency division duplex) mode. LTE-Advanced extended the capabilities of LTE systems with support of carrier aggregation, where up to five CCs (component carriers) are aggregated in order to support wider transmission bandwidths up to 100 MHz. The CCs may also be referred to as serving cells. One CC is termed the Pcell (primary cell) and the other CCs are referred to as SCells. Subsequent releases of the LTE specification will provide support for up to 32 CCs. A primary concern of the present disclosure is efficient transmission of data acknowledgement signals by a UE to an eNB in response to DL data transmissions over a large number of DL CCs.

DETAILED DESCRIPTION

Figure 1:
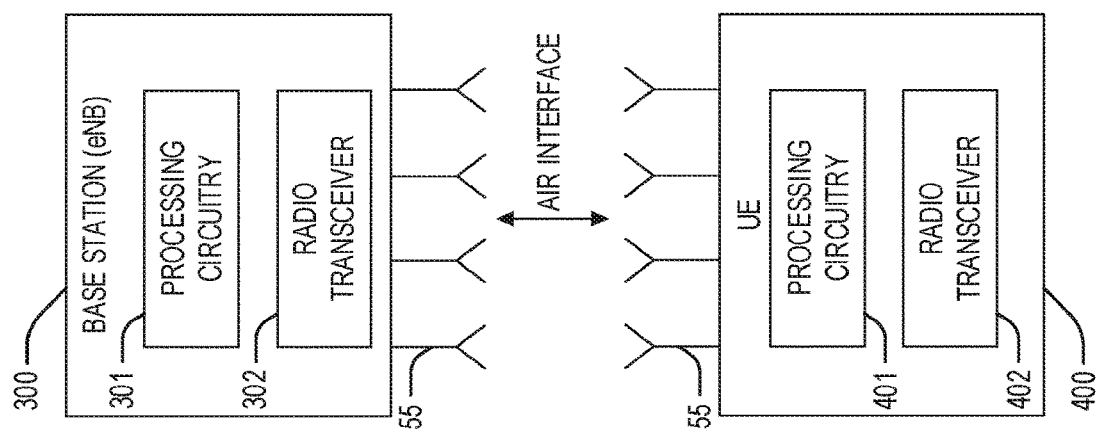
FIG. 1 illustrates an example UE and eNB according to some embodiments.

FIG. 1 illustrates an example of the components of a UE 400 and a base station or eNB 300. The eNB 300 includes processing circuitry 301 connected to a radio transceiver 302 for providing an air interface. The UE 400 includes processing circuitry 401 connected to a radio transceiver 402 for providing an interface. Each of the transceivers in the devices is connected to antennas 55.

A UE transmits a number of control signals to the eNB, referred to as uplink control information (UCI). The current LTE standards specify that a UE transmits a hybrid automatic request repeat acknowledgement (HARQ-ACK) signal over the uplink (UL) in response to data packet reception over the downlink (DL). Depending on whether the data packet reception is correct or incorrect, the HARQ-ACK signal has an ACK or a NAK value, respectively. The UE transmits a scheduling request (SR) signal to request UL resources for signal transmission. The UE transmits channel state information (CSI) reports that include a channel quality indicator (CQI) signal to inform the eNB of the DL channel conditions it experiences, enabling the eNB to perform channel-dependent scheduling of DL data packets. The UE also transmits precoder matrix indicator/rank indicator (PMI/RI) signals to inform the eNB how to combine the transmission of a signal to the UE from multiple eNB antennas in accordance with a Multiple-Input Multiple-Output (MIMO) principle. Any of the possible combinations of HARQ-ACK, SR, CQI, PMI, and RI signals may be transmitted by a UE jointly with data information in the physical uplink shared channel (PUSCH), or separate from data information in the physical uplink control channel (PUCCH). The number of ACK bits for on UL subframe will depend on the number of DL carriers and the TDD configuration (in case of TDD). The maximum HARQ-ACK codebook size in the uplink by one UE in one subframe for DL CA of up to 32 CCs is at least 64 bits for frequency-division duplex (FDD) cells and can be selected from a set of values up to 638 bits for time division duplex (TDD) cells. Periodic CSI (P-CSI) bits for up to 32 CCs may reach to 352 bits as well. HARQ-ACK and CQI transmission may need to occur in the same sub-frame o then PUCCH in the absence of data transmission from a UE.

Figure 2:
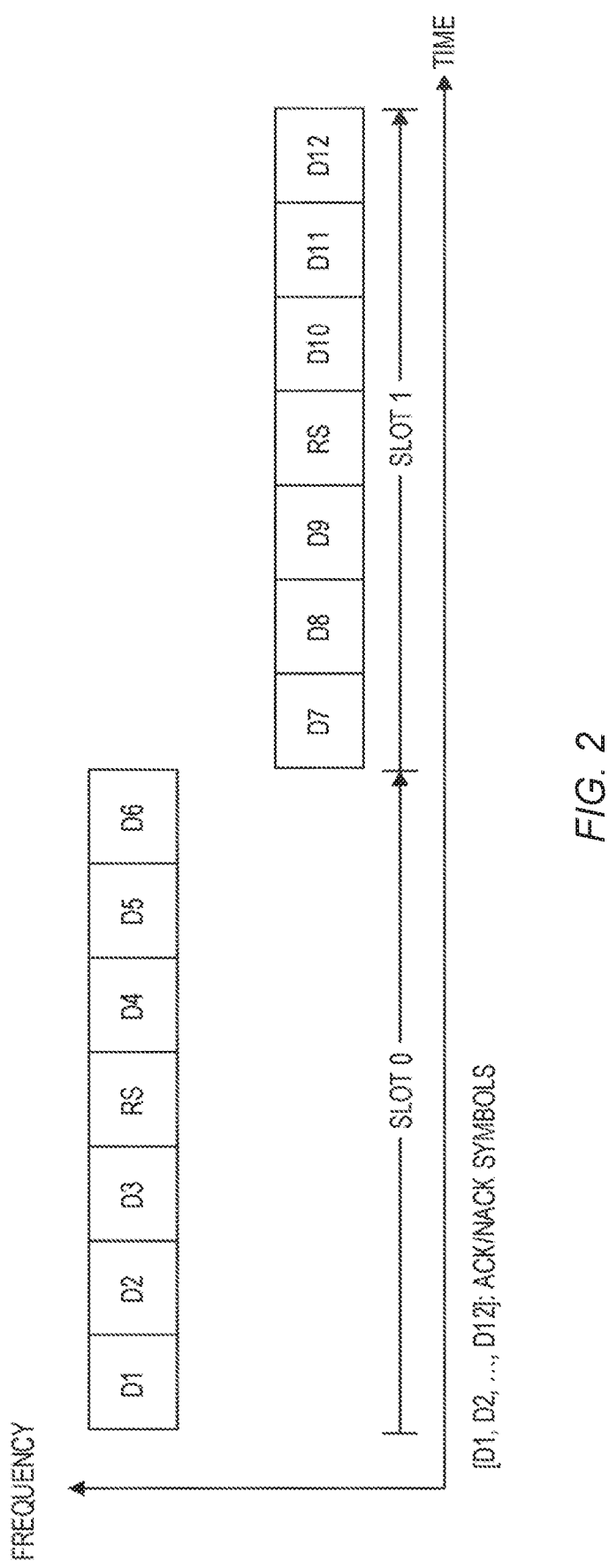
FIG. 2 illustrates large capacity PUCCH format according to some embodiments.

The different formats of the PUCCH previously defined by the LTE specifications (i.e., formats 1, 2, and 3) are not capable of conveying the amount of UCI necessary for up to 32 CCs as described above. A new PUCCH format, referred to herein as format X, for carrying this amount of UCI is illustrated in FIG. 2. As used herein, the term "PUCCH format X" refers to a PUCCH format that carries a larger amount of uplink control information (UCI) bits than format 3 as defined in the LTE specifications (i.e., more than 22 bits). The format X as illustrated is a PUSCH-like PUCCH structure with one demodulation reference signal (DMRS) per slot and may be without orthogonal cover codes (i.e., code division multiplexing or CDM) for data/control symbols. Shown in the figure are two slots separated in frequency where one slot contains symbols D1 through D6 for carrying UCI and the other contains symbols D7 through D12 for carrying UCL Each slot also has a single reference signal RS (i.e., a DMRS). The format may be designed to preserve the single-carrier property of the single carrier frequency-division multiplexing (SC-FDM) used in the uplink and avoid increasing the cubic metric (CM) of concurrent transmissions of HARQ-ACK/SR and multi-CCs CQI bits when these UCIs are multiplexed in the same PUCCH.

Described herein are techniques for concurrently transmitting multiple UCIs using a high-capacity PUCCH format such as format X in a massive CA application including simultaneously transmitting periodic CSI (P-CSI) bits together with HARQ-ACK/SR bits in a multi-CC scenario. The issues addressed by the described techniques, which take into account the different UCI target block error rate (BLER) requirements (1% BLER for HARQ-ACK and 1~5% BLER for CQI), include: how to select a proper PUCCH channel out of a set of configured resources to carry UCI bits with guaranteed performance and maximized payload size, how to design the channel coding scheme to differentiate the UCI transmission taking into account the different performance targets to improve UL throughput performance, and whether and how to implement conditional suspension or dropping of partial UCI in some cases (e.g., power limited cases).

The described techniques provide resource allocation methods for the new PUCCH format X, a channel selection algorithm when transmission of UCIs happens in a single UL subframe, such as multi-CCs HARQ-ACK/SR together with multi-CCs CSI bits; the use of joint coding or separate coding for multiple UCIs transmission on a PUCCH format X resource that is configurable in an explicit manner or implicit manner; criteria to enable UE determines itself whether to transmit deprioritized UCI or not, involving either a ratio of PUCCH resources for HARQ-ACK/SR and/or RI symbols; and various solutions to implement joint coding and separate coding scheme, including power control equation design for joint coding as well as resource elements number determination for separate coding to minimize the UCI overhead taking different HARQ-ACK and P-CSI performance targets into account for each channel coding scheme.

In one embodiment, a plurality of PUCCH resources may be configured by higher layers for UCI (including HARQ-ACK, Scheduling Request (SR), CSI, or a combination thereof) on PUCCH. In one example of this embodiment, there may be at least two different sets of PUCCH resources on UL PCell or PUCCH SCell or pSCell. A first set of PUCCH format X resources are semi-statically signaled by radio resource control (RRC) signaling for UE configured with more than 5 CCs. In addition, a second set of PUCCH resource are allocated for multi-CCs P-CSI transmission. Particularly, the second set of PUCCH resources may be a subset of the first set of PUCCH format X resources to save UL control overhead. Alternatively, the second set of PUCCH resources may be different PUCCH format X resources or a combination of PUCCH format 3 resource and new PUCCH format X resources. In an example of this embodiment, a UE may be configured with two PUCCH resources having different payload size in the second set. As the UE only reports P-CSI for these activated CCs, configuring two PUCCHs with different capacities can maximize the spectral efficiency. The PUCCH with the larger payload size (e.g., PUCCH format X) is used when the number of activated CCs is larger; While, UE can select the PUCCH (e.g. PUCCH format 3) with smaller payload size when a small amount of CCs are activated. An alternative is to tie the PUCCH channel selection to the uplink hybrid ARQ ACK/NAKs such that the PUCCH with larger capacity is selected only when HARQ-ACK bits are transmitted.

Figure 3:
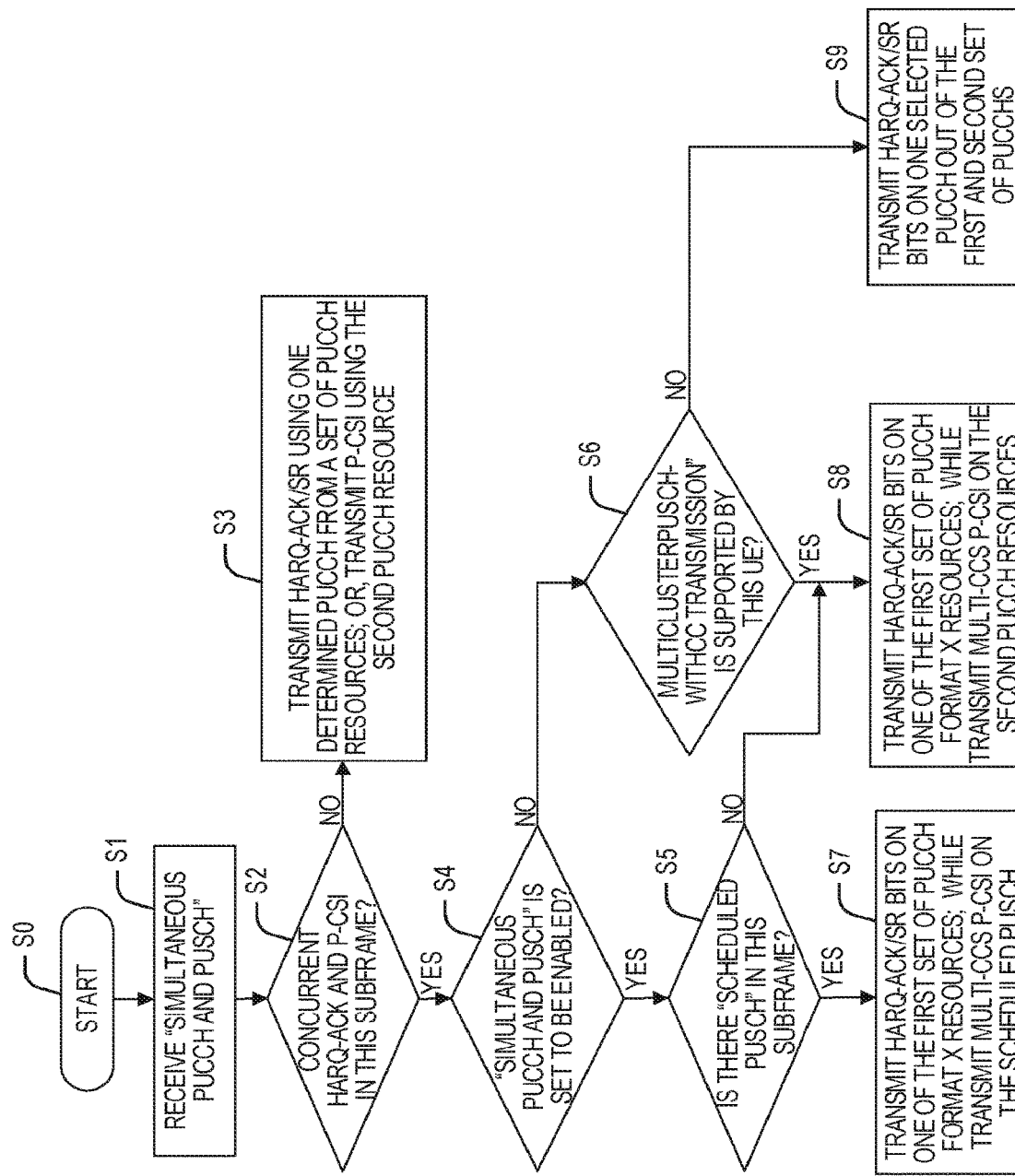
FIG. 3 illustrates an example procedure for selecting a PUCCH resource according to some embodiments.

FIG. 3 illustrates an example procedure executed by a UE to select a PUCCH resource. The UE starts at stage S0 and receives configuration information as whether simultaneous PUCCH and PUCCH transmission is permitted at stage S1. At stage S2, whether there is to be concurrent transmission of HARQ-ACK and P-CSI bits in a single UL subframe. If not, one of a first set of PUCCH resources that include format X resources for HARQ-ACK bits and 1-bit positive/negative SR or one of a second set of PUCCH resources for P-CSI bits without HARQ-ACK/SR bits is selected at stage S3. The UE could select which PUCCH format X resource to use based on a dynamic indicator IE in the detected downlink control information (DCI) formats. In addition, dynamic indication of PUCCH format X resources for HARQ-ACK bits can be done by using additional relative or explicit dynamic indication to select actual PUCCH resources out of the set of implicit/explicitly reserved (e.g., semi-statically reserved) resources. In case of collision between at least a periodic CSI report and an HARQ-ACK in a same subframe, the UE behaves as follows. If the UE is configured by higher layers with simultaneous PUCCH and PUSCH transmissions as determined at stage S4 or the UE is capable of multi-cluster PUSCH-with CC transmission as determined at stage S6, then, if there is no scheduling PUSCH as determined at stage S5, the HARQ-ACK is transmitted in the determined PUCCH resource of the first set and the P-CSI is transmitted in the second PUCCH resource at stage S8 using two separate precoders or a single DFT precoder. Otherwise, the HARQ-ACK is transmitted in the determined PUCCH resource of the first set and the P-CSI is transmitted in the PUSCH at stage S7 using two separate DFT precoders. Otherwise, the P-CSI is multiplexed with the HARQ-ACK in the selected PUCCH resource at stage S9. The PUCCH resource selection may be achieved by implicit rule such as the PUCCH resource with a larger capacity, the determined PUCCH resource out of the first set or the one of second set of PUCCH resources, or the PUCCH with the smallest UCI capacity but still able to accommodate the total bit numbers of all UCIs. Alternatively, a reserved PUCCH resource can be indicated explicitly via signaling to the UE (e.g. RRC signaling), or by a combination of implicit and explicit signaling. In addition, for simultaneous transmission of multi-CCs HARQ-ACK and multi-CCs P-CSI using PUCCH format X, the maximum allowed P-CSI payload may be RRC configurable. Dropping the P-CSI report or truncation of the least significant bits of the CSI report may be used in case the RRC-configured allowable maximum CSI payload is smaller than the number of CSI bits in a subframe.

Figure 4:
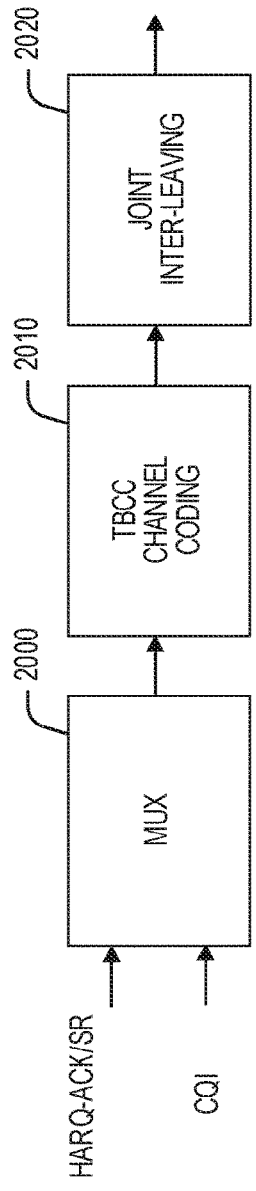
FIG. 4 illustrates joint coding of HARQ-ACK and P-CSI bits according to some embodiments.

Various schemes may be used to transmit a combination of HARQ-ACK/SR bits and multi-CCs P-CSI in one selected PUCCH in a subframe as shown at stage S9 in FIG. 3. In one example scheme, referred to herein as scheme 1, joint coding is employed such that HARQ-ACK and channel quality information (CQI) bits for the P-CSI report are jointly encoded prior to transmission as illustrated in FIG. 4. The HARQ-ACK/SR bits and CQI bits are combined by multiplexer 2000, encoded by tail-biting convolutional coder (TBCC) 2010, and interleaved by channel interleaver 2020.

In some embodiments, power control for PUCCH transmission may be implemented by the UE as a function of the payload size and whether UL transmit diversity is enabled or not. In addition, the number of resource blocks (RBs) of the selected PUCCH resource $N_{RB}^{PUCCH}$ may be also considered as a factor so that:

$$h(n_{HARQ}, n_{SR}, n_{CQI}) = f(N_{RB}^{PUCCH}, n_{HARQ}, n_{SR}, n_{CQI})$$

where $n_{CQI}$ corresponds to the number of information bits for the channel quality information; $n_{SR}=1$ if subframe i is configured for SR for the UE not having any associated transport block for UL-SCH and otherwise $n_{SR}=0$, and $n_{HARQ}$ is the number of HARQ-ACK bits sent in the subframe.

In one embodiment, to differentiate HARQ-ACK and P-CSI performance targets when the UE transmits HARQ-ACK/SR and periodic CSI, the power level may be adjusted by utilizing power control based on the actual information bits carried in PUCCH format X as follows:

$$P_{PUCCH}(i) = \min \begin{Bmatrix} P_{CMAX,c}(i), \\ P_{0\_PUCCH} + PL_c + h(n_{CQI}, n_{HARQ}, n_{SR}) + \Delta_{F\_PUCCH}(F) + \Delta_{TxD}(F') + g(i) \end{Bmatrix}$$

where $P_{CMAX,c}(i)$ is the configured maximum UE transmit power defined in subframe i for the serving cell, the parameter $\Delta_{F\_PUCCH}(F)$ is provided by higher layers corresponding to a PUCCH format. if the UE is configured by higher layers to transmit PUCCH on two antenna ports the value of $\Delta_{TxD}(F')$ is provided by higher layers and otherwise $\Delta_{TxD}(F')=0$, and $h(n_{CQI}, n_{HARQ}, n_{SR})$ is a PUCCH format dependent value. In one example of this embodiment, $h(n_{CQI}, n_{HARQ}, n_{SR})$ may be determined as follows:

$$h(n_{HARQ}, n_{SR}, n_{CQI}) = $$
$$a + b*10*\log10((n_{HARQ} + n_{SR} - 1) \cdot \beta + n_{CQI} \cdot \alpha) - 10*\log10(N_{RB}^{PUCCH})$$

where α and β may be configured by higher layers for a UE or predetermined by specification. Example values for α and β are:

α=1, β=1 if presence of HARQ-ACK and/or SR and otherwise 0<α<1, β=0, and
a=−14 and b=1.

In another example of this embodiment, $$h(n_{HARQ}, n_{SR}, n_{CQI}) = 10*\log10\left(\frac{n-1}{K}\right) - 10*\log10(N_{RB}^{PUCCH})$$

where: $n=n_{HARQ}+n_{SR}+n_{CQI}$; K=22 or 23 or 25.
Alternatively, $h(n_{CQI}, n_{HARQ}, n_{SR})$ may be determined using following equation:

$$h(n_{HARQ}, n_{SR}, n_{CQI}) = $$
$$a + ((n_{HARQ} + n_{SR} - 1) \cdot \beta + n_{CQI} \cdot \alpha)/b - 10*\log10(N_{RB}^{PUCCH})$$

The following are example values:
α=1, β=1 if presence of HARQ-ACK and/or SR and otherwise 0<α<1, β=0, and
a=−2 or −1 and 10≤b<15

In case the transmission of HARQ-ACK feedback coincides with transmission of SR with or without CSI/RI bits, the SR bit (1=positive SR; 0=negative SR) may be appended at the start or end of the sequence of concatenated HARQ-ACK bits or may be appended at the start or end of the sequence of concatenated CSI bits when there is no HARQ-ACK bits (i.e. concurrent transmission of P-CSI and SR without HARQ-ACK). In one embodiment, a method is provided for a UE to suspend/drop CSI transmission if one of two following conditions is met:

1) Condition 1: Combined HARQ-ACK and CSI payload is smaller than a predetermined value L.
2) Condition 2: Ratio of CSI payload over HARQ-ACK payload is smaller than a predetermined value. Condition 1 is intended to avoid operation with very large code rates which may not ensure target reception reliability, even if UE can substantially increase transmission power (at the cost of additional interference). The motivation of Condition 2 is that multiplexing many CSI bits with few HARQ-ACK bits is not desirable in terms of required power.

Figure 5:
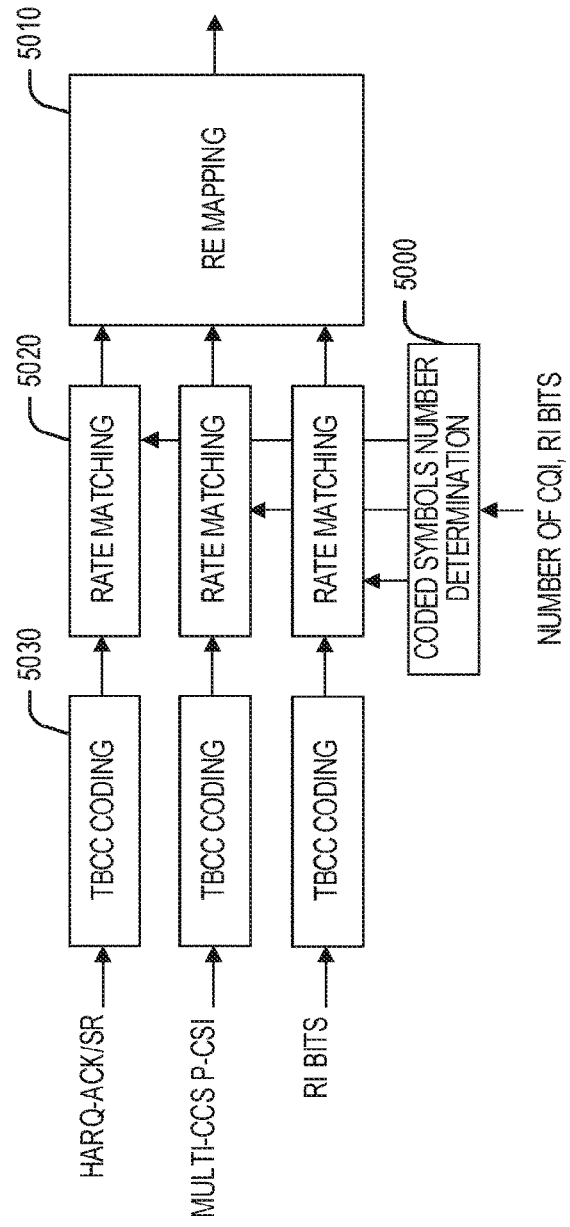
FIG. 5 illustrates separate coding of HARQ-ACK and P-CSI bits according to some embodiments.

In another scheme, referred to herein as scheme 2, separate coding is employed such that different coding rates for the control information (e.g. HARQ-ACK/SR vs. multi-CCs period CSI) on PUCCH using PUCCH format X are achieved by allocating different number of resource elements (REs) for coded symbols transmission. FIG. 5 illustrates an example of separate coding where HARQ-ACK/SR bits, CQI bits, and RI bits are separately encoded by tail-biting convolutional coders (TBCC) 5030, rate matching performed by stage 5020 and mapped to resource elements (REs) by stage 5010. The number of coded symbols is determined by stage 5000.

In one embodiment, three parameters $\beta_{offset}^{HARQ-ACK}$, $\beta_{offset}^{RI}$ and $\beta_{offset}^{CQI}$ may be configured by higher layers, respectively. Alternatively, a set of offset values $\beta_{offset}^{HARQ-ACK}$ for different HARQ-ACK codebook sizes may be configured or implicitly derived for the number of HARQ-ACK coded symbol calculation with accounting for the channel coding gains and avoid overestimation of the HARQ-ACK resources.

In one embodiment, two values may be configured as $\beta_{offset,1}^{HARQ-ACK}$, $\beta_{offset,2}^{HARQ-ACK}$. The smaller value $\beta_{offset,1}^{HARQ-ACK}$ is used when HARQ-ACK bits number is larger than a predefined or signaled threshold; otherwise, the larger value $\beta_{offset,2}^{HARQ-ACK}$ is used to guarantee the DTX detection performance at eNB side. In another example, one offset value for each HARQ-ACK codebook size may be provided for the UE by higher layers by higher layer signaling. Alternatively, these values may be derived from the one signaled for a reference HARQ-ACK codebook size (e.g. 22 bits), no additional signaling is required. For example, a factor SF(O) may be introduced for this purpose and used in the determination of HARQ-ACK and RI resources in order to account for the TBCC coding gain over the repetition code for a HARQ-ACK and RI payload of O bits. The values $\beta_{offset}^{HARQ-ACK}$ or $\beta_{offset}^{RI}$ in the equations set forth below may be values after applying the factor.

Example methods are described below tier stage 5000 in FIG. 5 to determine the number of coded bits for different UCIs multiplexed on a PUCCH, taking into account the RI payload is known at both the eNB and the UE. In a first embodiment, when UE transmits HARQ-ACK bits, SR bits or rank indicator (RI) bits, it shall determine the number of coded symbols $Q'_{UCI}$ for HARQ-ACK or rank indicator as $$Q'_{UCI} = \min\left(\text{ceiling}\left(\frac{O_{UCI} \cdot M_{sc}^{PUCCH} \cdot N_{symb}^{PUCCH} \cdot \beta_{offset}^{PUCCH}}{O_{CQI-MIN}}\right), T_{UCI}\right) \quad (1)$$

where $O_{UCI}$ is the number of HARQ-ACK/SR bits including CRC bits or RI bits; $M_{sc}^{PUCCH}$ is the bandwidth for selected PUCCH in the current subframe expressed as a number of subcarrier, and $N_{symb}^{PUCCH}$ is the number of SC-FDMA symbols in the current PUSCH transmission sub-frame given by $N_{symb}^{PUCCH}=(2(N_{symb}^{UL}-1)-N_{SRS})$, where $N_{symb}^{UL}$ denotes number of SC-FDMA symbols in an uplink slot; $N_{SRS}$ is equal to 1 if UE is configured to send PUCCH and SRS in the same subframe for the current subframe, or if the PUCCH resource allocation for the current subframe even partially overlaps with the cell-specific SRS subframe and bandwidth configuration, or if the current subframe is a UE-specific Type-1 SRS subframe, or if the current subframe is a UE-specific Type-0 SRS subframe and the UE is configured with multiple TAGs. Otherwise $N_{SRS}$ is equal to 0; $O_{CQI-MIN}$ is the number of CQI bits including CRC bits assuming rank equals to 1 for all serving cells for which a periodic CSI report is configured. For HARQ-ACK information:

$$\beta_{offset}^{PUCCH} = \beta_{offset}^{HARQ-ACK}/\beta_{offset}^{CQI},$$

for RI bits:

$$\beta_{offset}^{PUCCH} = \beta_{offset}^{RI}/\beta_{offset}^{CQI}, \text{ and}$$

for CQI and/or PMI information:

$$Q'_{CQI} = N_{symb}^{PUCCH} \cdot \beta_{offset}^{PUCCH} - Q'_{RI}.$$

For multiple UCI signals, different thresholds $T_{UCI}$ may be predefined values applicable to all UEs or they may be signaled to the UE through higher layers signaling for different UCI transmission in a subframe. $T_{HARQ-ACK}$ denotes the threshold for HARQ-ACK bits; while $T_{RI}$ denotes threshold for RI bits. Various $T_{UCI}$ values may include one or more following values:

$$T_{ACK} = X \cdot M_{SC}^{PUCCH}, \text{ where } X \in \{4, 8, N_{symb}^{PUCCH}\}.$$

$$T_{RI} = 4 \cdot M_{SC}^{PUCCH}.$$

In a second embodiment, HARQ-ACK is allowed to multiplex over all symbols of selected PUCCH. When UE transmits CQI bits or rank indicator (RI) bits together with HARQ-ACK bits, it shall determine the number of coded symbols $Q'_{UCI}$ for CQI or rank indicator as $$Q'_{UCI} = \min\left( \text{ceiling}\left( \frac{O_{UCI} \cdot M_{sc}^{PUCCH} \cdot N_{symb}^{PUCCH} \cdot \beta_{offset}^{PUCCH}}{O_{HARQ-ACK-REF}} \right), T_{UCI} \right) \quad (2)$$

where $O_{UCI}$ is the number of CQI bits including CRC bits or RI bits; $O_{HARQ-ACK-REF}$ is the HARQ-ACK codebook size dynamically indicated by means of the corresponding DCI formats detected by UE. Alternatively, $O_{HARQ-ACK-REF}$ may be the number of HARQ-ACK/SR information bits including CRC bits. The meaning of other symbols in equation (2) is same as in equation (1) above. More specifically, $T_{UCI}$ may not be defined for calculating the number of symbols for CQI information. The value of $T_{RI}$ may be $4 \cdot M_{SC}^{PUCCH}$ as above. For CQI information:

$$\beta_{offset}^{PUCCH} = \beta_{offset}^{CQI}/\beta_{offset}^{HARQ-ACK},$$

for RI bits:

$$\beta_{offset}^{PUCCH} = \beta_{offset}^{RI}/\beta_{offset}^{HARQ-ACK}, \text{ and}$$

for HARQ-ACK information $$Q'_{HARQ-ARK} = N_{symb}^{PUCCH} \cdot \beta_{offset}^{PUCCH} - Q'_{RI} - Q'_{CQI}.$$

In a third embodiment, when UE transmits CQI bits, SR bits or rank indicator (RI) bits together with HARQ-ACK bits, it shall determine the number of coded symbols $Q'_{UCI}$ for HARQ-ACK, or rank indicator as $$O_{REF} = O_{HARQ-ACK} \cdot \beta_{offset}^{HARQ-ACK} + O_{RI} \cdot \beta_{offset}^{RI} + O_{CQI-MIN} \cdot \beta_{offset}^{CQI} \quad (3)$$

$$Q'_{HARQ-ACK} = \quad (4)$$
$$\min\left( \text{ceiling}\left( \frac{O_{HARQ-ACK} \cdot M_{sc}^{PUCCH} \cdot N_{symb}^{PUCCH} \cdot \beta_{offset}^{HARQ-ACK}}{O_{REF}} \right), T_{HARQ-ACK} \right)$$

$$Q'_{RI} = \min\left( \text{ceiling}\left( \frac{O_{RI} \cdot M_{sc}^{PUCCH} \cdot N_{symb}^{PUCCH} \cdot \beta_{offset}^{RI}}{O_{REF}} \right), T_{RI} \right) \quad (5)$$

where $O_{HARQ-ACK}$, $O_{RI}$ is the number of HARQ-ACK/SR bits including CRC bits and RI bits respectively; $O_{CQI-MIN}$ is the number of CQI bits including CRC bits assuming rank equals to 1 for all serving cells for which a periodic CSI report is configured. For CQI and/or PMI information:

$$Q'_{CQI} = N_{symb}^{PUCCH} \cdot \beta_{offset}^{PUCCH} - Q'_{RI} - Q'_{HARQ-ACK}$$

In another aspect of the present disclosure, a method is provided for a UE to decide whether to transmit P-CSI information together with HARQ-ACK/SR and RI coded symbols on a PUCCH in a same TTI. A ratio of an amount of resources required for transmission of the HARQ-ACK/SR and/or RI information in the PUCCH over a total amount of resources available for transmission of the control information in the PUCCH is determined by the UE. More specifically, a cell domain and/or time domain HARQ-ACK bundling may be first performed before calculating the aforementioned ratio. Then, the CSI information is transmitted together with the HARQ-ACK and RI information in the PUCCH resource by the UE, when the ratio is less than or equal to a threshold value. Otherwise, UE shall drop or suspend the CSI information transmission.

In one embodiment, at stage 5010 of FIG. 5, HARQ-ACK encoded symbols may be mapped to symbols starting from those consecutive to RS of PUCCH channel in increasing order of first symbol index in time domain, then the frequency index, starting from the lowest frequency index in the selected PUCCH resource. While CQI symbols is mapped in a time-first order from the beginning of the physical resource blocks assigned for transmission of selected PUCCH. Additionally, the HARQ-ACK/SR symbols may puncture CQI symbols starting from the lowest frequency index (i.e. first embodiment) or may perform rate matching around the CQI and RI symbols e.g. in the second and third embodiment above.

In one embodiment, an offset value A may be introduced to adjust the code rate of different UCIs by splitting the reserved bits for HARQ-ACK/SR and P-CSI bits in case of concurrent transmission. In more details, assuming the total payload size of PUCCH format is S, then the total bits for HARQ-ACK/SR bits rate-matching equal to ceiling (S/2)+ Δ, while S−ceiling(S/2)−Δ0 A space is left for P-CSI bits rate-matching operation. The offset value(s) Δ may be signaled by higher layers semi-statically or dynamically indicated through DCI formats or a combination of them.

In one embodiment, the channel coding schemes for multi-CCs periodic channel quality information (CQI and/or PMI), HARQ-ACK and rank indication may be configurable by higher layers. Either scheme 1 or scheme 2 as described above may be employed.

Example UE Description

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 6:
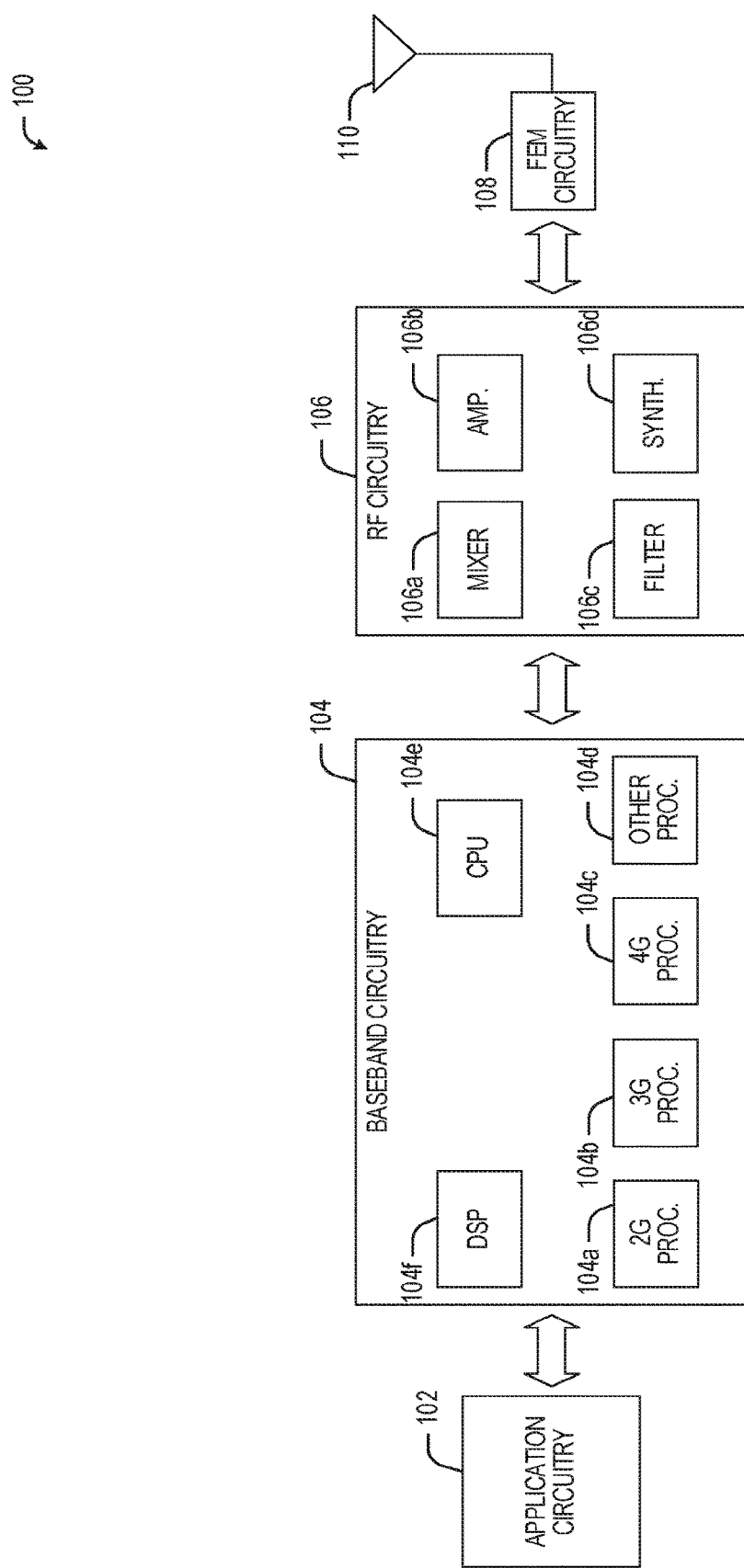
FIG. 6 illustrates an example of a user equipment device according to some embodiments.

Embodiments described herein may be implemented into a system using any suitably configured hardware and/or software. FIG. 6 illustrates, for one embodiment, example components of a User Equipment (UE) device 100. In some embodiments, the UE device 100 may include application circuitry 102, baseband circuitry 104, Radio Frequency (RF) circuitry 106, front-end module (FEM) circuitry 108 and one or more antennas 110, coupled together at least as shown.

The application circuitry 102 may include one or more application processors. For example, the application circuitry 102 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 104 may include circuitry such as, but not limited to, one or more single-core or multi-core processors. The baseband circuitry 104 may include one or more baseband processors and/or control logic to process baseband signals received from a receive signal path of the RF circuitry 106 and to generate baseband signals for a transmit signal path of the RF circuitry 106. Baseband processing circuitry 104 may interface with the application circuitry 102 for generation and processing of the baseband signals and for controlling operations of the RF circuitry 106. For example, in some embodiments, the baseband circuitry 104 may include a second generation (2G) baseband processor 104a, third generation (3G) baseband processor 104b, fourth generation (4G) baseband processor 104c, and/or other baseband processor(s) 104d for other existing generations, generations in development or to be developed in the future (e.g., fifth generation (5G), 6G, etc.). The baseband circuitry 104 (e.g., one or more of baseband processors 104a-d) may handle various radio control functions that enable communication with one or more radio networks via the RF circuitry 106. The radio control functions may include, but are not limited to, signal modulation/demodulation, encoding/decoding, radio frequency shifting, etc. In some embodiments, modulation/demodulation circuitry of the baseband circuitry 104 may include Fast-Fourier Transform (FFT), preceding, and/or constellation mapping/demapping functionality. In some embodiments, encoding/decoding circuitry of the baseband circuitry 104 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 104 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 104e of the baseband circuitry 104 may be configured to run elements of the protocol stack for signaling of the PHY, MAC, RLC, PDCP and/or RRC layers. In some embodiments, the baseband circuitry may include one or more audio digital signal processor(s) (DSP) 104f. The audio DSP(s) 104f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 104 and the application circuitry 102 may be implemented together such as, for example, on a system on a chip (SOC).

In some embodiments, the baseband circuitry 104 may provide for communication compatible with one or more radio technologies. For example, in some embodiments, the baseband circuitry 104 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 104 is configured to support radio communications of more than one wireless protocol may be referred to as multi-mode baseband circuitry.

RF circuitry 106 may enable communication with wireless networks using modulated electromagnetic radiation through a non-solid medium. In various embodiments, the RF circuitry 106 may include switches, filters, amplifiers, etc. to facilitate the communication with the wireless network. RF circuitry 106 may include a receive signal path which may include circuitry to down-convert RF signals received from the FEM circuitry 108 and provide baseband signals to the baseband circuitry 104. RF circuitry 106 may also include a transmit signal path which may include circuitry to up-convert baseband signals provided by the baseband circuitry 104 and provide RF output signals to the FEM circuitry 108 for transmission.

In some embodiments, the RF circuitry 106 may include a receive signal path and a transmit signal path. The receive signal path of the RF circuitry 106 may include mixer circuitry 106a, amplifier circuitry 106b and filter circuitry 106c. The transmit signal path of the RF circuitry 106 may include filter circuitry 106c and mixer circuitry 106a. RF circuitry 106 may also include synthesizer circuitry 106d for synthesizing a frequency for use by the mixer circuitry 106a of the receive signal path and the transmit signal path. In some embodiments, the mixer circuitry 106a of the receive signal path may be configured to down-convert RF signals received from the FEM circuitry 108 based on the synthesized frequency provided by synthesizer circuitry 106d. The amplifier circuitry 106b may be configured to amplify the down-converted signals and the filter circuitry 106c may be a low-pass filter (LPF) or band-pass filter (BPF) configured to remove unwanted signals from the down-converted signals to generate output baseband signals. Output baseband signals may be provided to the baseband circuitry 104 for further processing. In some embodiments, the output baseband signals may be zero-frequency baseband signals, although this is not a requirement. In some embodiments, mixer circuitry 106a of the receive signal path may comprise passive mixers, although the scope of the embodiments is not limited in this respect.

In some embodiments, the mixer circuitry 106a of the transmit signal path may be configured to up-convert input baseband signals based on the synthesized frequency provided by the synthesizer circuitry 106d to generate RF output signals for the FEM circuitry 108. The baseband signals may be provided by the baseband circuitry 104 and may be filtered by filter circuitry 106c. The filter circuitry 106c may include a low-pass filter (LPF), although the scope of the embodiments is not limited in this respect.

In some embodiments, the mixer circuitry 106a of the receive signal path and the mixer circuitry 106a of the transmit signal path may include two or more mixers and may be arranged for quadrature downconversion and/or upconversion respectively. In some embodiments, the mixer circuitry 106a of the receive signal path and the mixer circuitry 106a of the transmit signal path may include two or more mixers and may be arranged for image rejection (e.g., Hartley image rejection). In some embodiments, the mixer circuitry 106a of the receive signal path and the mixer circuitry 106a may be arranged for direct downconversion and/or direct upconversion, respectively. In some embodiments, the mixer circuitry 106a of the receive signal path and the mixer circuitry 106a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 106 may include analog-to-digital converter (ADC) and digital-to-analog converter (DAC) circuitry and the baseband circuitry 104 may include a digital baseband interface to communicate with the RF circuitry 106.

In some dual-mode embodiments, a separate radio IC circuitry may be provided for processing signals for each spectrum, although the scope of the embodiments is not limited in this respect.

In some embodiments, the synthesizer circuitry 106d may be a fractional-N synthesizer or a fractional N/N+1 synthesizer, although the scope of the embodiments is not limited in this respect as other types of frequency synthesizers may be suitable. For example, synthesizer circuitry 106d may be a delta-sigma synthesizer, a frequency multiplier, or a synthesizer comprising a phase-locked loop with a frequency divider.

The synthesizer circuitry 106d may be configured to synthesize an output frequency for use by the mixer circuitry 106a of the RF circuitry 106 based on a frequency input and a divider control input. In some embodiments, the synthesizer circuitry 106d may be a fractional N/N+1 synthesizer.

In some embodiments, frequency input may be provided by a voltage controlled oscillator (VCO), although that is not a requirement. Divider control input may be provided by either the baseband circuitry 104 or the applications processor 102 depending on the desired output frequency. In some embodiments, a divider control input (e.g., N) may be determined from a look-up table based on a channel indicated by the applications processor 102.

Synthesizer circuitry 106d of the RF circuitry 106 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 106d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency ($f_{LO}$). In some embodiments, the RF circuitry 106 may include an IQ/polar converter.

FEM circuitry 108 may include a receive signal path which may include circuitry configured to operate on RF signals received from one or more antennas 110, amplify the received signals and provide the amplified versions of the received signals to the RF circuitry 106 for further processing. FEM circuitry 108 may also include a transmit signal path which may include circuitry configured to amplify signals for transmission provided by the RF circuitry 106 for transmission by one or more of the one or more antennas 110.

In some embodiments, the FEM circuitry 108 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RE signals and provide the amplified received RF signals as an output (e.g., to the RF circuitry 106). The transmit signal path of the FEM circuitry 108 may include a power amplifier (PA) to amplify input RF signals (e.g., provided by RF circuitry 106), and one or more filters to generate RF signals for subsequent transmission (e.g., by one or more of the one or more antennas 110.

In some embodiments, the UE device 100 may include additional elements such as, for example, memory/storage, display, camera, sensor, and/or input/output (I/O) interface.

Example Machine Description

Figure 7:
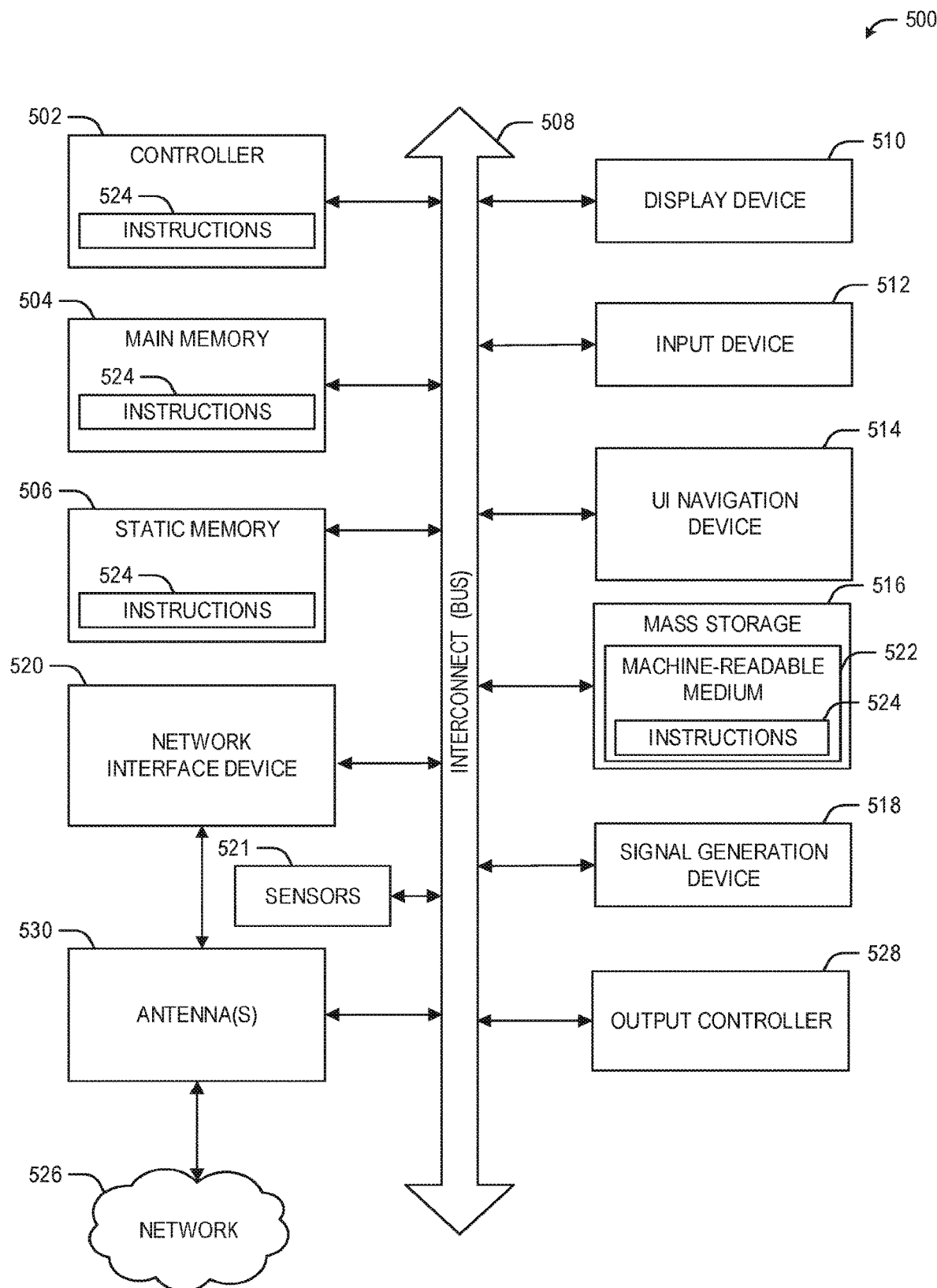
FIG. 7 illustrates an example of a computing machine according to some embodiments.

FIG. 7 illustrates a block diagram of an example machine 500 upon which any one or more of the techniques (e.g., methodologies) discussed herein may perform. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a user equipment (UE), evolved Node B (eNB), Wi-Fi access point (AP), Wi-Fi station (STA), personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 516 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. In some examples, the network interface device 520 may wirelessly communicate using Multiple User MIMO techniques. The term "transmission medium" shall be taken to include any intangible medium that is capable of storing, encoding or carrying instructions for execution by the machine 500, and includes digital or analog communications signals or other intangible medium to facilitate communication of such software.

Additional Notes and Examples

In Example 1, an apparatus for a UE (user equipment), comprises: a radio transceiver and processing circuitry interfaced to the radio transceiver; wherein the processing circuitry and transceiver are to receive information elements (IEs) configuring first and second sets of physical uplink control channel (PUCCH) resources for transmitting uplink control information (UCI), wherein each the first and the second set of PUCCH resources include a first and a second PUCCH format resource having different UCI capacities; wherein the processing circuitry and transceiver, when the UE is configured with more than five component carriers (CCs) and when UCI to be transmitted on PUCCH of a single uplink (UL) subframe includes hybrid automatic repeat request acknowledgement (HARQ-ACK) bits and/or periodic channel state information (P-CSI) bits, are to: transmit the HARQ-ACK bits and P-CSI bits if present using a selected PUCCH format resource from the first set of PUCCH resources based on the total bits number of UCI payload, when the UCI includes either HARQ-ACK transmission only or a combination of HARQ-ACK bits and P-CSI bits; and, transmit the P-CSI bits using a selected PUCCH format resource from the second set of PUCCH resources based on the total bits number of UCI payload when the UCI does not include HARQ-ACK bits.

In Example 2, the subject matter of Example 1 or any of the Examples herein may further include wherein the processing circuitry and transceiver are to, if scheduling request (SR) bits are to be transmitted in the single UL subframe: transmit the SR bit with the HARQ-ACK bits or P-CSI bits by appending the 1-bit SR at the end of the sequence of HARQ-ACK bits if HARQ-ACK bits are present or at the start of the sequence of P-CSI bits if HARQ-ACK bits are not present.

In Example 3, the subject matter of Example 1 or any of the Examples herein may further include wherein a first set of PUCCH resources includes one or more resources of PUCCH format 3 and one or more resources of the other PUCCH format having a UCI capacity larger than PUCCH format 3.

In Example 4, the subject matter of Example 1 or any of the Examples herein may further include wherein the second set of PUCCH resources includes one or more resources of PUCCH format 2 and one or more resources of the other PUCCH format having a larger UCI capacity than PUCCH format 2.

In Example 5, the subject matter of Example 1 or any of the Examples herein may further include wherein the processing circuitry and transceiver are to select, from either of the first and second sets of PUCCH resources, a resource of the second PUCCH format with a larger capacity when the total bits number of UCI payload for the active CCs is above a specified threshold and select a resource of the first PUCCH format with a smaller payload otherwise.

In Example 6, the subject matter of Example 1 or any of the Examples herein may further include wherein the specified thresholds used for selecting a PUCCH format are different for the first set of PUCCH resources and the second set of PUCCH resources.

In Example 7, the subject matter of Example 1 or any of the Examples herein may further include wherein the processing circuitry and transceiver, when the UE is configured with simultaneous PUCCH and PUSCH transmission and when UCI includes HARQ-ACK bits and P-CSI bits, are to: if a PUSCH is scheduled for the single UL subframe, transmit the HARQ-ACK bits using a selected PUCCH format resource from the first set of PUCCH resources and transmit the P-CSI bits on the PUSCH; and, if no PUSCH is scheduled for the single UL subframe, transmit the HARQ-ACK bits using a selected PUCCH resource from the first set and transmit the P-CSI bits using a PUCCH resource selected from the second set of PUCCH resources.

In Example 8, the subject matter of Example 1 or any of the Examples herein may further include wherein the processing circuitry is to, when HARQ-ACK bits and P-CSI bits are multiplexed on the selected PUCCH resource in a single UL subframe, jointly code the HARQ-ACK bits, P-CSI bits, and a scheduling request (SR) bit if present.

In Example 9, the subject matter of Example 1 or any of the Examples herein may further include wherein, when performing joint coding, the processing circuitry is to sequentially append P-CSI bits and an SR bit if present at the end of concatenated HARQ-ACK bits.

In Example 10, the subject matter of Example 1 or any of the Examples herein may further include wherein, when performing joint coding, the processing circuitry is to drop some of the P-CSI bits and transmit the HARQ-ACK/SR bits without dropping if the total number of UCI payload exceeds the capacity of the selected PUCCH resource.

In Example 11, the subject matter of Example 1 or any of the Examples herein may further include wherein the processing circuitry, when HARQ-ACK and/or P-CSI bits and/or an SR bit are multiplexed in a selected PUCCH resource, is to determine a transmission power based on the total number of bits in the UCI payload and the number of resource blocks of the selected PUCCH resource.

In Example 12, the subject matter of Example 1 or any of the Examples herein may further include wherein the transmission power $P_{PUCCH}(i)$ for the selected PUCCH resource in the single UL subframe i is calculated as:

$$P_{PUCCH}(i) = \min \begin{Bmatrix} P_{CMAX,c}(i), \\ P_{0\_PUCCH} + PL_c + h(n_{CQI}, n_{HARQ}, n_{SR}) + \Delta_{F\_PUCCH}(F) + \Delta_{TxD}(F') + g(i) \end{Bmatrix}$$

where $h(n_{CQI}, n_{HARQ}, n_{SR})$ is a function of parameter $N_{RB}^{PUCCH}$, $n_{HARQ}$, $n_{CQI}$ and $n_{SR}$ denoting by:

$$h(n_{HARQ}, n_{SR}, n_{CQI}) = f(N_{RB}^{PUCCH}, n_{HARQ}, n_{SR}, n_{CQI})$$

and where $n_{HARQ}$ is the number of HARQ-ACK bits, $n_{SR}=1$ if an SR is to be transmitted and otherwise $n_{SR}=0$, $n_{CQI}$ corresponds to the number of bits for the channel quality information (CQI) in the P-CSI reports, $N_{RB}^{PUCCH}$ is the number of resource blocks in the selected PUCCH resource, is a $P_{CMAX,c}(i)$ is a configured maximum UE transmit power in subframe i, the parameter $\Delta_{F\_PUCCH}(F)$ is provided by higher layers corresponding to the selected PUCCH format, the value of $\Delta_{TxD}$ (F') is provided by higher layers if the UE is configured to transmit PUCCH on two antenna ports and is zero otherwise, α and β are configured by higher layers or are predetermined values.

In Example 13, the subject matter of Example 1 or any of the Examples herein may further include wherein:

$$h(n_{HARQ}, n_{SR}, n_{CQI}) = a +$$
$$b * 10 * \log 10((n_{HARQ} + n_{SR} - 1) \cdot \beta + n_{CQI} \cdot \alpha) - 10 * \log 10(N_{RB}^{PUCCH}) \text{ or}$$
$$h(n_{HARQ}, n_{SR}, n_{CQI}) = 10 * \log 10\left(\frac{n-1}{K}\right) - 10 * \log 10(N_{RB}^{PUCCH}) \text{ or}$$
$$h(n_{HARQ}, n_{SR}, n_{CQI}) =$$
$$a + ((n_{HARQ} + n_{SR} - 1) \cdot \beta + n_{CQI} \cdot \alpha)/b - 10 * \log 10(N_{RB}^{PUCCH})$$

where $n = n_{HARQ} + n_{SR} + n_{CQI}$;

In Example 14, the subject matter of Example 1 or any of the Examples herein may further include wherein the processing circuitry is to, when HARQ-ACK bits and P-CSI bits are multiplexed in a selected PUCCH resource, separately code the HARQ-ACK bits and P-CSI bits.

In Example 15, the subject matter of Example 1 or any of the Examples herein may further include wherein the processing circuitry is to: map HARQ-ACK coded symbols to symbols starting from resource elements (REs) adjacent to a reference signal (RS) of PUCCH in increasing order of first symbol index in time domain and then the frequency index starting from the lowest frequency index in the selected PUCCH resource; map channel quality information (CQI) coded symbols in a time-first order from the beginning of physical resource blocks assigned for transmission of the PUCCH.

In Example 16, the subject matter of Example 1 or any of the Examples herein may further include wherein the processing circuitry and transceiver are to; receive $\beta_{offset,1}^{HARQ-ACK}$ and $\beta_{offset,2}^{HARQ-ACK}$ values configured by higher layers; use the smaller value $\beta_{offset,1}^{HARQ-ACK}$ to calculate the resources for HARQ-ACK transmission when HARQ-ACK bits number is larger than a predefined or signaled threshold; and, use the larger value $\beta_{offset,2}^{HARQ-ACK}$ to calculate the resources for HARQ-ACK transmission otherwise.

In Example 17, a computer-readable medium comprises instructions to cause a user equipment (UE), upon execution of the instructions by processing circuitry of the UE, to: receive information elements (IEs) configuring first and second sets of physical uplink control channel (PUCCH) resources for transmitting uplink control information (UCI), wherein each the first and the second set of PUCCH resources include a first and a second PUCCH format resource having different UCI capacities; wherein the processing circuitry and transceiver, when the UE is configured with more than five component carriers (CCs) and when UCI transmitted on PUCCH of a single uplink (UL) subframe includes hybrid automatic repeat request acknowledgement (HARQ-ACK) bits and/or periodic channel state information (P-CSI) bits, are to: transmit the HARQ-ACK bits and P-CSI bits if present using a selected PUCCH resource from the first set of PUCCH resources based on the total bits number of UCI payload, when the UCI includes either HARQ-ACK transmission only or a combination of HARQ-ACK bits and P-CSI bits; and transmit the P-CSI bits using a selected PUCCH resource from the second set of PUCCH resources based on the total bits number of UCI payload when the UCI does not include HARQ-ACK bits.

In Example 18, the subject matter of Example 17 or any of the Examples herein may further include instructions to, if scheduling request (SR) bits are to be transmitted on the single UL subframe, transmit the SR bit with the HARQ-ACK bits or P-CSI bits by appending the 1-bit SR at the end of the sequence of HARQ-ACK bits if HARQ-ACK bits are present or at the start of the sequence of P-CSI bits if HARQ-ACK bits are not present.

In Example 19, the subject matter of Example 17 or any of the Examples herein may further include wherein a first set of PUCCH resources includes one or more resources of PUCCH format 3 and one or more resources of the other PUCCH format having a UCI capacity larger than PUCCH format 3.

In Example 20, the subject matter of Example 17 or any of the Examples herein may further include wherein the second set of PUCCH resources includes one or more resources of PUCCH format 2 and one or more resource of the other PUCCH format having a larger UCI capacity than PUCCH format 2.

In Example 21, the subject matter of Example 17 or any of the Examples herein may further include instructions to select, from either of the first and second sets of PUCCH resources, a resource of the second PUCCH format with a larger capacity when the total bits number of UCI payload for the active CCs is above a specified threshold and select a resource of the first PUCCH format with a smaller payload otherwise.

In Example 22, the subject matter of Example 17 or any of the Examples herein may further include instructions to select a resource of the PUCCH format having a larger UCI capacity from the first set of PUCCH resources when a combination of HARQ-ACK bits and P-CSI bits are to be transmitted in the UCI on PUCCH in a single UL subframe.

In Example 23, the subject matter of Example 17 or any of the Examples herein may further include comprising instructions to, when the UE is configured with simultaneous PUCCH and PUSCH transmission and when UCI includes HARQ-ACK bits and P-CSI bits: if a PUSCH is scheduled for the single UL subframe, transmit the HARQ-ACK bits using a selected PUCCH format resource from the first set of PUCCH resources and transmit the P-CSI bits on the PUSCH; and, if no PUSCH is scheduled for the single UL subframe, transmit the HARQ-ACK bits using a selected PUCCH resource from the first set and transmit the P-CSI bits using a PUCCH resource selected from the second set of PUCCH resources.

In Example 24, the subject matter of Example 17 or any of the Examples herein may further include instructions to, when HARQ-ACK bits and P-CSI bits are multiplexed on the selected PUCCH resource in a single UL subframe, jointly code the HARQ-ACK bits, P-CSI bits, and a scheduling request (SR) bit if present.

In Example 25, the subject matter of Example 17 or any of the Examples herein may further include instructions to, when performing joint coding, sequentially append P-CSI bits and an SR bit if present at the end of concatenated HARQ-ACK bits.

In Example 26, the subject matter of Example 17 or any of the Examples may further include instructions to cause the UE to perform any of the functions performed by processing circuitry and transceiver in Examples 1 through 16 or described elsewhere in this document.

In Example 27, an apparatus for an evolved Node B (eNB) comprises: a radio transceiver and processing circuitry interfaced to the radio transceiver; wherein the processing circuitry and transceiver are to configure a UE perform as recited in any of Examples 1 through 16.

In Example 28, a method for operating a UE comprises performing any of the functions of the processing circuitry and transceiver as recited in any of Examples 1 through 16.

In Example 29, an apparatus for a UE comprises means for performing any of the functions of the processing circuitry as recited in any of Examples 1 through 16.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The embodiments as described above may be implemented in various hardware configurations that may include a processor for executing instructions that perform the techniques described. Such instructions may be contained in a machine-readable medium such as a suitable storage medium or a memory or other processor-executable medium.

The embodiments as described herein may be implemented in a number of environments such as part of a wireless local area network (WLAN), 3rd Generation Partnership Project (3GPP) Universal Terrestrial Radio Access Network (UTRAN), or Long-Term-Evolution (LTE) or a Long-Term-Evolution (LTE) communication system, although the scope of the invention is not limited in this respect. An example LTE system includes a number of mobile stations, defined by the LTE specification as User Equipment (UE), communicating with a base station, defined by the LTE specifications as an eNB.

Antennas referred to herein may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, antennas may be effectively separated to take advantage of spatial diversity and the different channel characteristics that may result between each of antennas and the antennas of a transmitting station. In some MIMO embodiments, antennas may be separated by up to $1/10$ of a wavelength or more.

In some embodiments, a receiver as described herein may be configured to receive signals in accordance with specific communication standards, such as the Institute of Electrical and Electronics Engineers (IEEE) standards including IEEE 802.11 standards and/or proposed specifications for WLANs, although the scope of the invention is not limited in this respect as they may also be suitable to transmit and/or receive communications in accordance with other techniques and standards. In some embodiments, the receiver may be configured to receive signals in accordance with the IEEE 802.16-2004, the IEEE 802.16(e) and/or IEEE 802.16 (m) standards for wireless metropolitan area networks (WMANs) including variations and evolutions thereof, although the scope of the invention is not limited in this respect as they may also be suitable to transmit and/or receive communications in accordance with other techniques and standards. In some embodiments, the receiver may be configured to receive signals in accordance with the Universal Terrestrial Radio Access Network (UTRAN) LTE communication standards. For more information with respect to the IEEE 802.11 and IEEE 802.16 standards, please refer to "IEEE Standards for Information Technology—Telecommunications and information Exchange between Systems"—Local Area Networks—Specific Requirements—Part 11 "Wireless LAN Medium Access Control (MAC) and Physical Layer (PHY), ISO/IEC 8802-11: 1999", and Metropolitan Area Networks-Specific Requirements—Part 16: "Air Interface for Fixed Broadband Wireless Access Systems," May 2005 and related amendments/versions. For more information with respect to UTRAN LTE standards, see the 3rd Generation Partnership Project (3GPP) standards for UTRAN-LTE, including variations and evolutions thereof.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

The invention claimed is:

1. An apparatus of a user equipment (UE), the apparatus comprising:
processing circuitry, wherein the processing circuitry is configured to:
receive a configuration by higher layers of at least first and second sets of physical uplink control channel (PUCCH) resources for transmitting uplink control information (UCI);
select a PUCCH resource from the at least first and second sets of PUCCH resources for transmission of UCI based on an implicit rule, wherein the implicit rule comprises selecting the PUCCH resource based on a total number of UCI bits to be transmitted; and
when the selected PUCCH resource corresponds to a first PUCCH format, set transmission power for transmitting the UCI using the selected PUCCH resource based at least on a parameter provided by higher layers corresponding to the first PUCCH format, a number of resources blocks of the selected PUCCH resource, and a total number of UCI bits; and
memory coupled to the processing circuitry, wherein the memory is configured to store the UCI.

2. The apparatus of claim 1,
wherein the implicit rule further comprises selecting the PUCCH resource with a smallest UCI capacity that can accommodate the total number of UCI bits to be transmitted.

3. The apparatus of claim 1, wherein selecting the PUCCH resource is performed based on a combination of the implicit rule and explicit signaling, wherein the explicit signaling is via downlink control information (DCI).

4. The apparatus of claim 1, wherein the UCI includes a hybrid automatic repeat request acknowledgement (HARQ-ACK) responsive to data received on a physical downlink shared channel (PDSCH).

5. The apparatus of claim 4, wherein the UCI further includes periodic channel state information (CSI) associated with the PDSCH.

6. The apparatus of claim 1, wherein the at least first and second sets of PUCCH resources are associated with PUCCH format 3 and the first PUCCH format.

7. The apparatus of claim 1, wherein the first PUCCH format has a larger payload size than PUCCH format 3, and wherein the first PUCCH format is used to carry more than 23 bits.

8. A user equipment (UE), comprising:
a radio;
processing circuitry coupled to the radio, wherein the processing circuitry is configured to:
receive a configuration by higher layers of at least first and second sets of physical uplink control channel (PUCCH) resources for transmitting uplink control information (UCI);
select a PUCCH resource from the at least first and second sets of PUCCH resources for transmission of UCI based on an implicit rule, wherein the implicit rule comprises selecting the PUCCH resource based on a total number of UCI bits to be transmitted; and
when the selected PUCCH resource corresponds to a first PUCCH format, set transmission power for transmitting the UCI using the selected PUCCH resource based at least on a parameter provided by higher layers corresponding to the first PUCCH format, a number of resources blocks of the selected PUCCH resource, and a total number of UCI bits; and
memory coupled to the processing circuitry, wherein the memory is configured to store the UCI.

9. The UE of claim 8,
wherein the implicit rule further comprises selecting the PUCCH resource with a smallest UCI capacity that can accommodate the total number of UCI bits to be transmitted.

10. The UE of claim 8, wherein selecting the PUCCH resource is performed based on a combination of the implicit rule and explicit signaling, wherein the explicit signaling is via downlink control information (DCI).

11. The UE of claim 8, wherein the UCI includes a hybrid automatic repeat request acknowledgement (HARQ-ACK) responsive to data received on a physical downlink shared channel (PDSCH).

12. The UE of claim 11, wherein the UCI further includes periodic channel state information (CSI) associated with the PDSCH.

13. The UE of claim 8, wherein the at least first and second sets of PUCCH resources are associated with PUCCH format 3 and the first PUCCH format.

14. The UE of claim 8, wherein the first PUCCH format has a larger payload size than PUCCH format 3, and wherein the first PUCCH format is used to carry more than 23 bits.

15. A method for operating a user equipment (UE), the method comprising:
receiving a configuration by higher layers of at least first and second sets of physical uplink control channel (PUCCH) resources for transmitting uplink control information (UCI);
selecting a PUCCH resource from the at least first and second sets of PUCCH resources for transmission of UCI based on an implicit rule, wherein the implicit rule comprises selecting the PUCCH resource based on a total number of UCI bits to be transmitted; and
when the selected PUCCH resource corresponds to a first PUCCH format, setting transmission power for transmitting the UCI using the selected PUCCH resource based at least on a parameter provided by higher layers corresponding to the first PUCCH format, a number of resources blocks of the selected PUCCH resource, and a total number of UCI bits; and
storing the UCI in memory.

16. The method of claim 15,
wherein the implicit rule further comprises selecting the PUCCH resource with a smallest UCI capacity that can accommodate the total number of UCI bits to be transmitted.

17. The method of claim 15, wherein selecting the PUCCH resource is performed based on a combination of the implicit rule and explicit signaling, wherein the explicit signaling is via downlink control information (DCI).

18. The method of claim 15,
wherein the UCI includes a hybrid automatic repeat request acknowledgement (HARQ-ACK) responsive to data received on a physical downlink shared channel (PDSCH), and
wherein the UCI further includes periodic channel state information (CSI) associated with the PDSCH.

19. The method of claim 15, wherein the at least first and second sets of PUCCH resources are associated with PUCCH format 3 and the first PUCCH format.

20. The method of claim 15, wherein the first PUCCH format has a larger payload size than PUCCH format 3, and wherein the first PUCCH format is used to carry more than 23 bits.

* * * * *